United States Patent [19]

Meisner

[11] 4,253,170

[45] Feb. 24, 1981

[54] TIME INDICATING LIGHT FIXTURE

[76] Inventor: Arthur L. Meisner, 2510 Country Club Ave., Omaha, Nebr. 68104

[21] Appl. No.: 691

[22] Filed: Jan. 2, 1979

[51] Int. Cl.[3] ...................... G04B 19/30; G04B 19/04; G01D 11/28

[52] U.S. Cl. ........................................ 368/67; 368/79; 368/80; 362/29

[58] Field of Search ............ 58/50 R, 50 A; 315/156, 315/159; 340/366 B, 767; 362/4, 20, 26, 29; 368/11, 67, 68, 116

[56] References Cited

U.S. PATENT DOCUMENTS

| | | | |
|---|---|---|---|
| 3,430,433 | 3/1969 | Sandor | 58/50 R |
| 3,747,322 | 7/1973 | Eckenrode | 58/50 R |
| 3,780,340 | 12/1973 | Munro | 315/156 |
| 4,139,802 | 2/1979 | Dubot et al. | 315/156 |

*Primary Examiner*—Vit W. Miska
*Attorney, Agent, or Firm*—Zarley, McKee, Thomte, Voorhees & Sease

[57] ABSTRACT

A light fixture which indicates the time of day includes a clock mechanism having a movable hand and an electrically operated illumination device arranged relative to the clock mechanism for casting a shadow of the hand on a surface. A light sensing device senses the ambient light intensity at the fixture location and it is operatively connected to the illumination device to increase the intensity of the illumination device in response to an increase in ambient light intensity and to decrease the intensity of the illumination device in response to a decrease in ambient light intensity.

13 Claims, 4 Drawing Figures

TIME INDICATING LIGHT FIXTURE

BACKGROUND OF THE INVENTION

This invention relates generally to decorative light fixtures and more particularly to an improved light fixture which casts a shadow of a movable hand or the like for indicating the time of day.

Interior decorating schemes often use indirect lighting to accent certain room or wall locations or to provide background lighting generally. In certain applications, it may be advantageous as well as aesthetically attractive to provide a light fixture which performs a dual function of both providing light and indicating the time of day. This can be accomplished by having the light cast a shadow of a movable clock hand or the like onto the surface illuminated by the light.

A problem of such an arrangement, however, is that a light of sufficient intensity to cast a visible shadow of a clock hand at night, for example, when there is little ambient light intensity, may be insufficient to cast a visible shadow of the clock hand during the day when the ambient light intensity is greatest. Simiarly, a light of sufficient intensity to cast a visible shadow of a clock hand under daylight conditions may be too bright for purposes of a decorative light fixture during the evening when the ambient light intensity is dim.

Shadow clocks have been previously known as shown in U.S. Pat. No. 3,430,433 for example. However, there has never heretofore been provided a fixture capable of casting a generally uniform shadow of a movable clock hand under varying conditions of ambient light intensity nor a clock which is capable of providing a light intensity which is satisfactory for decorative purposes for both daytime exposure to the sun and nighttime darkness.

Accordingly, it is a primary object of the present invention to provide an improved light fixture for indicating the time of day.

A further object of the invention is to provide such a light fixture including a device for sensing the ambient light intensity.

A further object is to provide such a light fixture including an illumination device connected in an electrical circuit for varying the intensity of the illumination device in accordance with ambient light intensity.

A further object of the invention is to provide such a light fixture wherein the operative elements thereof are concealed behind a decorative cover.

Finally, it is an object of the invention to provide a time telling light fixture which is economical to manufacture, refined in appearance and efficient in operation.

SUMMARY OF THE INVENTION

The light fixture of the present invention includes a time indicia mechanism having at least one movable hand for indicating the time of day and an electrically operated illumination means arranged relative to the time indicia mechanism for casting a visible shadow of the hand on a surface. The illumination device is connected in a circuit with a light sensing device which senses the ambient light intensity at the location of the fixture. The light sensing device and illumination device are operatively connected so as to increase the intensity of the illumination device in response to an increase in ambient light intensity and vice versa.

Accordingly, there is provided a light fixture capable of casting a generally uniform shadow indicative of the time of day under substantially varying ambient light conditions. The light fixture of the present invention also provides indirect lighting which may be effectively utilized for decorative accent whether exposed to bright daylight or dim night light.

The light sensing device may include a photo resistor. Additionally, the operative elements of the fixture including both the illumination device and time indicia mechanism may be concealed behind an aesthetically pleasing cover from which the time-telling shadows may be radially extended.

DESCRIPTION OF THE PREFERRED EMBODIMENT

Figure 1:
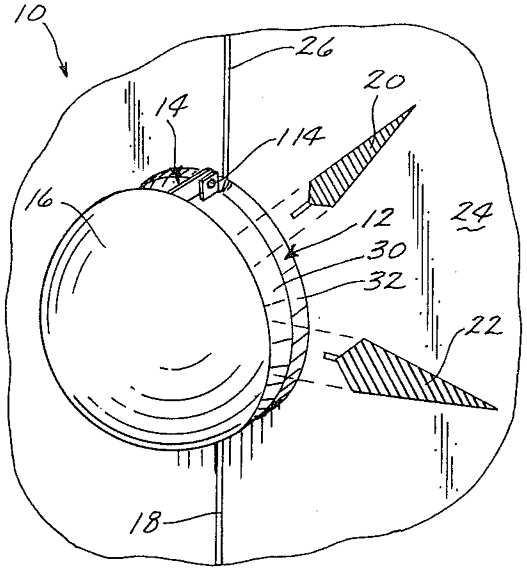
FIG. 1 is a perspective view showing a light fixture with shadows of the clock hands cast on a wall surface.

A light fixture, indicated generally at 10 in FIG. 1, includes a base member 12 having a standard 14 extended forwardly therefrom for supporting a decorative cover 16. An electrical cord 18 extends downwardly from the fixture 10 to a wall socket for providing electrical power to an illumination device on the fixture, as will be described hereinbelow. The illumination device is effective to cast shadows 20 and 22 of the hour and minute hands of a clock mechanism, also described hereinbelow. The shadows are cast on wall surface 24 on which the light fixture is supported. A line shadow 26 of standard 14 extends vertically upwardly from the fixture 10, preferably in alignment with cord 18, thereby providing a vertical reference to facilitate telling time by the shadows 20 and 22.

Figure 2:
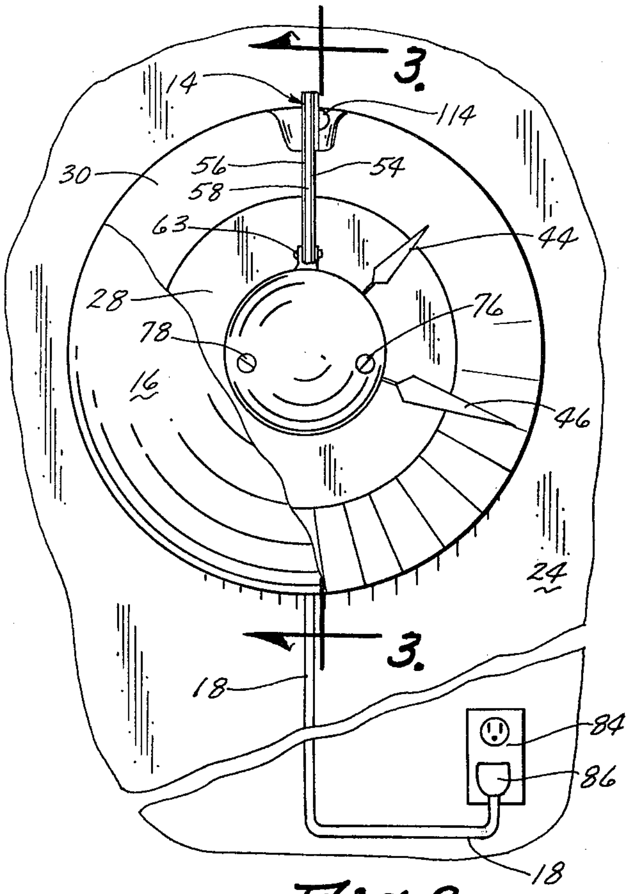
FIG. 2 is an enlarged front view of the light fixture of FIG. 1 with the cover broken away to show the underlying elements.
Figure 3:
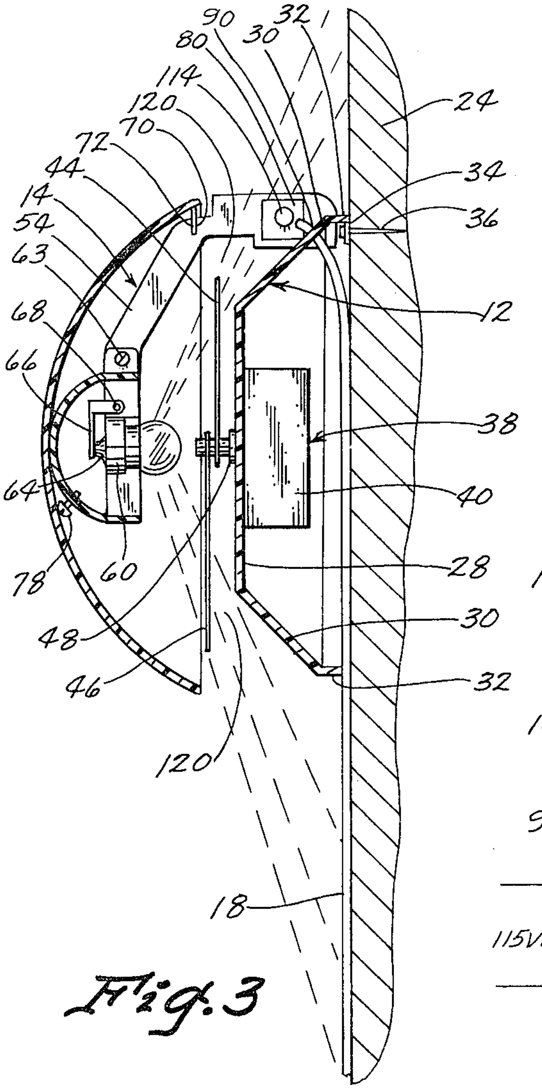
FIG. 3 is a side sectional view of the light fixture, taken along line 3—3 in FIG. 2.

Referring to FIGS. 2 and 3, it can be seen that base member 12 is generally bowl-shaped including a flat outer surface 28, an inclined peripheral sidewall 30 having an annular rim 32 which, in the preferred embodiment shown, is directed generally perpendicular to flat surface 28. A downturned flange 34 on an upper portion of rim 32 is provided with a suitable opening for supporting the base member 12 on a nail 36.

A time indicia mechanism or clock 38 is supported interiorly of base member 12, as shown best in FIG. 3. Clock 38 includes a housing 40 which contains a battery (not shown) for powering the usual drive elements for rotating a stem assembly 42 which extends forwardly through a central opening in the base member flat surface 28. Movable hour and minute hands 44 and 46 are rotatably carried on stem assembly 42 for indicating the time of day. The clock housing 40 may be supported within the base member 12 by any suitable means such as the nut 48 which is secured onto an externally threaded sleeve portion of stem assembly 42.

The electrically operated illumination means of the fixture includes the lightbulb 50 shown in FIG. 3 as being supported at the free end of standard 14 at a position forwardly of but aligned with the stem assembly 42 of clock 38. For this purpose, an upper portion 52 of standard 14 is inserted through a vertical slot in the top of base member 12 and securely anchored relative to the base member by any suitable means. In FIG. 2, it is seen that standard 14 is of layered construction including exterior metallic plates 54 and 56 applied to opposite sides of an insulative-type center plate 58.

Bulb 50 is supported within a socket 60 (FIG. 3) which is carried on a metallic hanger 62 secured to the standard 14 by bolt 63 for electrical connection to plate 54. Socket 60 is electrically insulated relative to hanger 62 but rather is electrically connected to plate 56. The base terminal 64 of bulb 50 is electrically contacted by an arm 66 which is electrically connected to hanger 62 at 68 and therefore to plate 54 of standard 14. Accordingly, electrical power to the bulb 50 is provided through the plates 54 and 56 on opposite sides of standard 14. Electrical power is communicated to the standard 14 through electrical cord 18 and a small circuit board described in detail hereinbelow.

The decorative cover 16 which conceals the bulb 50 and clock hands 44 and 46 from view, is shown in FIG. 3 as being of substantially hemispherical shape. To support cover 16 on the fixture, a vertical slot 70 is provided in the standard 14 as shown in FIG. 3 and a downturned flange 72 is provided at a peripheral location along the edge of cover 16 for receipt within slot 70. In addition, another generally hemispherical cover support member 74 is carried by the hanger 62 as shown in FIGS. 2 and 3. Two horizontally spaced-apart set screws 76 and 78 are threadably inserted through support member 74 to thereby provide three-point support for the cover. Adjustment of set screws 76 and 78 can effect a fore and aft pivotal movement of cover 16 relative to flange 72 or a pivotal adjustment about a vertical axis through flange 72. It can be seen in FIGS. 2 and 3 that the cover 16 is large enough and so positioned to conceal the bulb 50 and clock 38 at least from an observer's eye positioned along a line through the clock and perpendicular to the wall surface 24. In the preferred form shown, cover 16 provides a sufficient shield so that the clock hands are visible only to an observer looking along the wall surface 24 as in the view of FIG. 3.

Referring to FIG. 2, it is seen that the source of electric power for the lightbulb 50 is a conventional wall socket 84. A transformer 86 is plugged into socket 84 to reduce the voltage from 115 volts A.C. to 12 volts A.C. In FIGS. 2 and 3, it is seen that transformer 86 is electrically connected by cord 18 to a small circuit board 88 supported on one side of the standard 14. A suitable hole 90 is provided in the base member 12 for passage of electrical cord 18 therethrough. The structure and operation of the circuit board 88 can best be explained with reference to the electrical circuit diagram of FIG. 4.

Electrical cord 18 includes a pair of lead wires 92 and 94 which connect the transformer 86 to a rectifier 96, shown as a full wave bridge rectifier designated W04M-7601. A 1000 microfarad capacitor 98 is connected in parallel across the output of rectifier 96. One side of the rectifier 96 is connected through plate 56 to the lightbulb 50 and the other side of the rectifier is electrically connected by line 100 to the collector 102 of a 2N-4905 transistor 104. The base 106 of transistor 104 is also connected to line 100 through variable resistor 108 having a range of 0–5 Kohm which is arranged in parallel with a line 110 along which a similar variable resistor 112 and a photo resistor 114 are connected in series. Photo resistor 114 may be of the type designated CL-504L, for example. Finally, the emitter 116 of transistor 104 is connected through plate 54 to the base terminal 64 of lightbulb 50.

In FIGS. 2 and 3, it can be seen that photo resistor 114 is positioned on circuit board 88 at a location adjacent the outer periphery of cover 16 so as to be directly exposed to ambient light surrounding the fixture 10.

Figure 4:
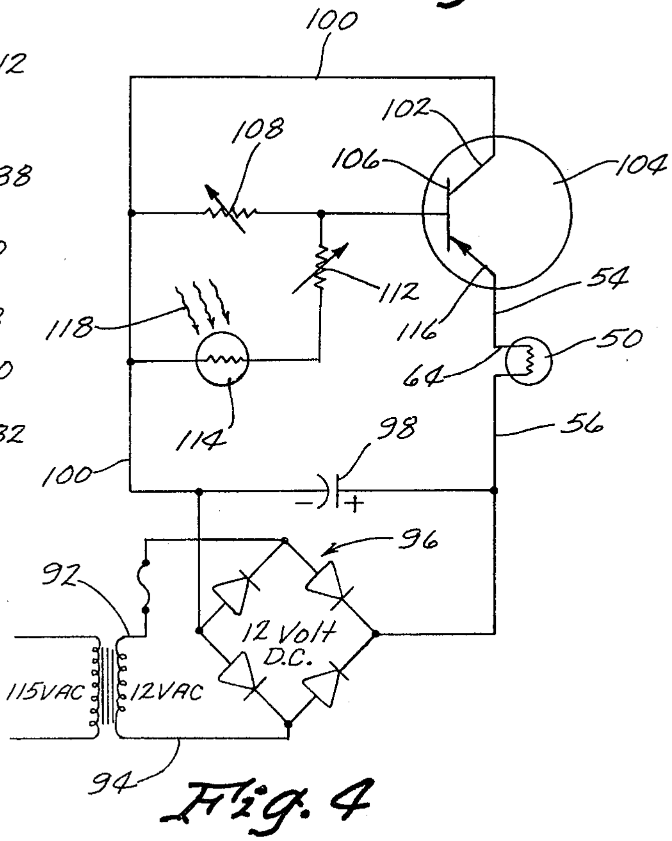
FIG. 4 is a schematic electrical circuit diagram for the light fixture.

In operation, the intensity of ambient light, indicated by arrows 118 in FIG. 4, striking the photo resistor 114 will regulate the effective resistance of the photo resistor and therefore the illumination of lightbulb 50. With increasing ambient light intensity, the bulb illumination will also increase and with decreasing ambient light intensity, the bulb illumination will likewise decrease.

The resistors 108 and 112 can be varied to adjust the range of intensity for bulb 50. Increasing the resistance of variable resistor 112 with the ambient intensity greatest will set the upper limit of the bulb intensity. Likewise, increasing the resistance of variable resistor 108 with the ambient intensity the least will set the low limit of the bulb intensity.

It can be seen in FIG. 3 that an annular clearance 120 is provided between the cover 16 and base member 12 so that light from bulb 50 can pass therethrough and strike the wall surface 24. Since the clock hands 44 and 46 interrupt the passage of light through clearance 120, the shadows 20 and 22 are cast on the wall surface 24. Since the intensity of lightbulb 50 is varied in accordance with the ambient light intensity sensed by photo resistor 114, bulb 50 will automatically brighten to cast visible shadows 20 and 22 during the bright daylight hours and will automatically dim to provide aesthetic accent lighting for darker settings or during the darker evening hours. As a result, the clock hand shadows 20 and 22 will remain generally uniform to the eye of an observer under varying conditions of ambient light intensity.

Whereas a preferred form of the invention is shown in the drawings, it is understood that various changes may be made without departing from the scope of the invention as defined in the appended claims. For example, various means may be provided for supporting the cover 16 relative to base member 12 and, in certain embodiments, it may be desirable to position the bulb rearwardly of the clock hands and reflect light from the bulb onto a surface by a mirror positioned forwardly of the clock hands. The specific shape of the clock hands may be selected according to any desired aesthetic pattern for the clock hand shadows.

I claim:

1. A light fixture comprising
   - a time indicia mechanism having at least one movable hand for indicating the time of day,
   - an electrically operated illumination means arranged relative to said time indicia mechanism for casting a shadow of said hand, and
   - a light sensing means for sensing ambient light intensity, said light sensing means being operatively connected to said illumination means to continuously adjust the intensity of said illumination means in generally proportionate response to variations in ambient light intensity sensed by said light sensing means, the intensity of said illumination means being increased in response to an increase in ambient light intensity and decreased in response to a decrease in ambient light intensity so that said shadow is generally equally as apparent at all times.

2. The light fixture of claim 1 wherein said light sensing means comprises a photo resistor.

3. The light fixture of claim 1 further comprising a base member and means for supporting said base member on a supporting surface, said time indicia mechanism and illumination means being so arranged that the shadow of said hand is cast on said supporting surface.

4. The structure of claim 3 wherein said hand is supported for rotation through 360° and said shadow is directed radially outwardly from said time indicia mechanism.

5. A light fixture which indicates the time of day comprising, an electrically operated illumination means, a clock mechanism including hand means movably positioned for indicating the time of day, means for supporting said clock mechanism adjacent a surface, means for supporting said illumination means relative to said clock mechanism for casting a shadow of said hand means on said surface, and an electrical circuit adapted for operatively connecting said illumination means to a source of electric power, said circuit including a light sensing means and being operative to continuously adjust the intensity of said illumination means in generally proportionate response to variations in the intensity of light sensed by said sensing means, the intensity of said illumination means being increased in response to an increase in ambient light intensity and decreased in response to a decrease in ambient light intensity so that said shadow is generally equally as apparent on said surface at all times.

6. The light fixture of claim 5 wherein said light sensing means comprises a photo resistor.

7. The structure of claim 5 wherein said hand means are supported for rotation through 360° and said shadow of said hand means being extended radially outwardly from said clock mechanism.

8. The light fixture of claim 5 further comprising a cover, said cover being large enough and so positioned to substantially conceal said illumination means and clock mechanism from an observer's eye positioned along a line through said clock mechanism and perpendicular to said surface.

9. A lighting device comprising, an electrically operated illumination means, and an electrical circuit adapted for operatively connecting said illumination means to a source of electric power, said circuit including a light sensing means and being operative to continuously adjust the intensity of said illumination means in generally proportionate response to variations in the intensity of light sensed by said sensing means, the intensity of said illumination means being increased in response to an increase in ambient light intensity and decreased in response to a decrease in ambient light intensity so that said light from said illumination means is generally equally as apparent at all times.

10. The lighting device of claim 9 wherein said light sensing means comprises a photo resistor.

11. The lighting device of claim 9 wherein said electrical circuit includes a pair of electrical lines adapted for connection to a source of electric power, a capacitor connected across said pair of electrical lines, a transistor having collector, emitter and base terminals, one of said lines being connected to the emitter terminal of said transistor and having said illumination means connected therealong, the other of said electrical lines being connected to the collector terminal of said transistor, said base terminal being connected to said other line through a first resistor and through a second resistor arranged in series with said light sensing means.

12. The lighting device of claim 11 wherein said light sensing means comprises a photo resistor.

13. The lighting device of claim 12 wherein said first and second resistors are variable resistors.

* * * * *